United States Patent [19]

Elkins

[11] 4,346,263

[45] Aug. 24, 1982

[54] SIGNALLING ARRANGEMENT FOR TELEPHONE EQUIPMENT

[75] Inventor: C. Edward Elkins, Pleasant Hill, Calif.

[73] Assignee: Badger Meter, Inc., Richmond, Calif.

[21] Appl. No.: 111,549

[22] Filed: Jan. 14, 1980

[51] Int. Cl.³ .......................................... H04M 11/00
[52] U.S. Cl. .................................................. 179/2 A
[58] Field of Search ........................... 179/2 A, 84 VF

[56] References Cited

U.S. PATENT DOCUMENTS

| | | | |
|---|---|---|---|
| 2,922,142 | 1/1960 | Lappin | 179/2 A |
| 3,400,219 | 9/1968 | Jahns et al. | 179/2 A |
| 3,492,439 | 1/1970 | Billingsley et al. | 179/2 A |
| 3,878,322 | 4/1975 | Sullivan | 354/84 |
| 3,937,889 | 2/1976 | Bell et al. | 179/2 A |
| 3,997,718 | 12/1976 | Ricketts et al. | 358/84 |
| 4,081,608 | 3/1978 | Hodnett | 179/2 A |
| 4,142,156 | 2/1979 | Freund | 358/84 X |
| 4,174,064 | 11/1979 | Pratt, Jr. | 179/2 A |
| 4,203,008 | 5/1980 | Cohn-Sfetcu et al. | 179/84 VF |
| 4,211,895 | 7/1980 | Davis et al. | 179/84 VF |
| 4,227,248 | 10/1980 | Munter | 179/84 VF |

Primary Examiner—Stuart N. Hecker
Attorney, Agent, or Firm—Lothrop & West

[57] ABSTRACT

Each of a number of remote subscriber telephones is connected through its own pair of lines, including ground lines, to a central office in the usual way. Each of many or all of the subscriber telephones has near it a special subscriber end equipment for doing a local job and connected across the related subscriber telephone. In the central office where the ground lines merge into a ground line going to one side of the standard direct current battery, supplying the remote subscriber telephones, there is a modulator in series in the ground line and effective to vary the voltage across the regular line pairs at a frequency or frequencies other than the voice frequency range but effective to actuate all of the special subscriber end equipments.

16 Claims, 1 Drawing Figure

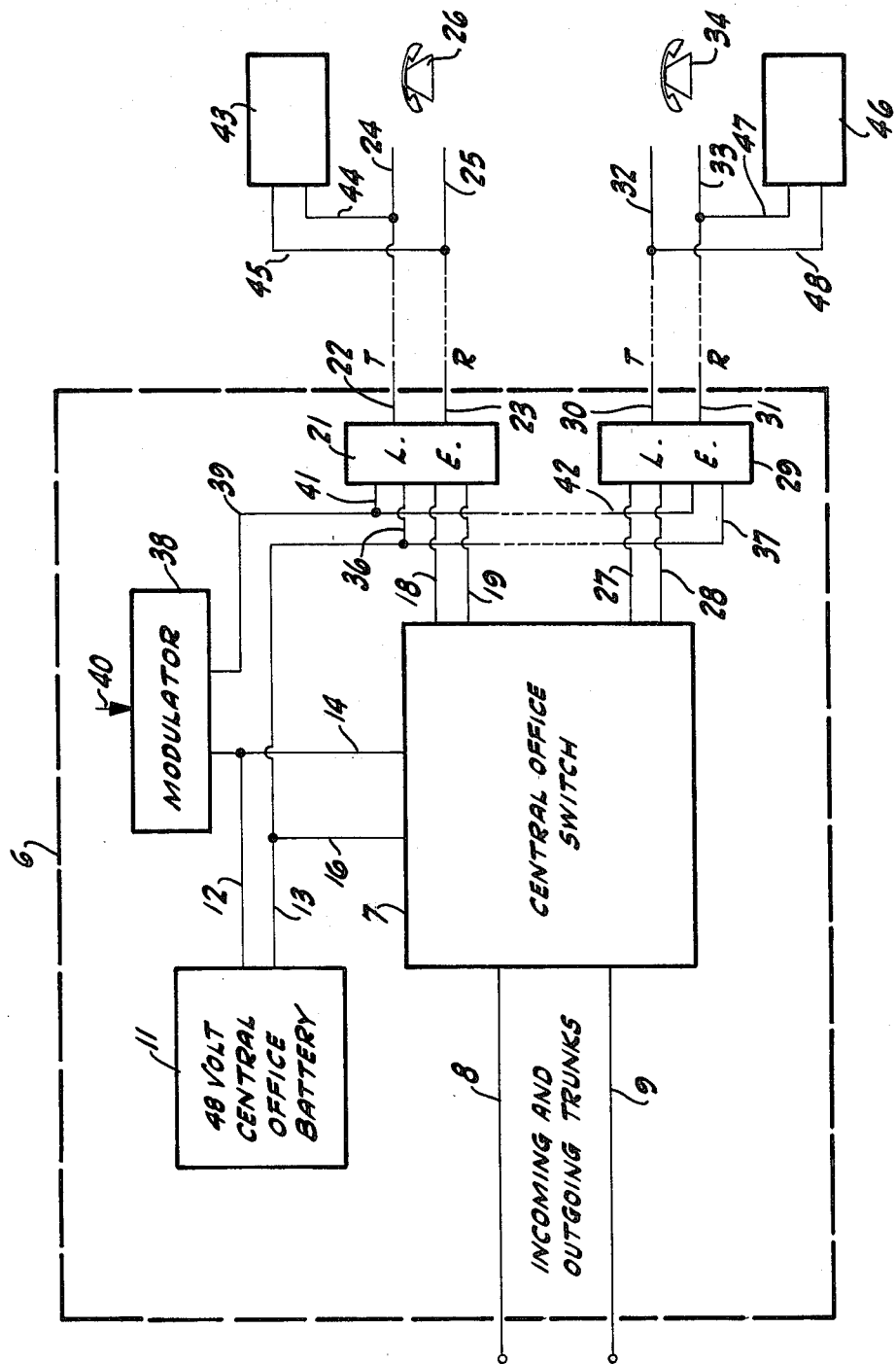

4,346,263

SIGNALLING ARRANGEMENT FOR TELEPHONE EQUIPMENT

CROSS-REFERENCES TO RELATED APPLICATIONS

None.

BRIEF SUMMARY OF THE INVENTION

A telephone system has a plurality of remote subscriber telephones each connected to a central office through the usual voice frequency lines. The various remote telephones are particularly connected by those lines to a common electrical battery at the central office. Adjacent each one of all or many of the subscriber telephones at the subscribers' locations there is also provided an individual responsive device. Each such device is locally connected in circuit with the respective subscriber's telephone. Each such remote responsive device is thus electrically connected to the central office electrical battery. A signal supplied by a modulating device at the central office and connected through the battery line and lines produces a corresponding response in the responsive devices at the subscribers' locations. The central office modulator and the subscribers' responsive devices operate at other than the voice frequencies normally transmitted to and from the subscribers' telephones by the mentioned, usual lines.

BRIEF DESCRIPTION OF THE DRAWING

The FIGURE is a diagram showing a typical central office arrangement with standard telephone connections into and away therefrom to remote subscribers' telephones and showing in the central office a special modulator effective through the battery lines and effective at other than voice frequencies upon special subscriber equipment adjacent the subscriber telephones.

DETAILED DESCRIPTION

In order to utilize a standard telephone communication system for the purpose of handling additional communications other than normal conversational or voice messages, there is provided an especial arrangement in connection with the common battery at a typical central station; for example, a means at the battery of impressing a non-voice signal on the usual voice circuits for effect upon special responsive units at the subscribers' locations.

In the usual case, the central office 6 is of a representative character having a central office switch mechanism 7 of a standard kind. This is connected by trunks 8 and 9 extending from the central office switch mechanism 7 to remote stations of a similar nature. Messages are transferred substantially at voice frequencies back and forth between the remote offices or stations and the central office 6. The central office switch mechanism 7 is supplied with operating electricity from a direct current battery 11, usually of about 48 volts, located nearby in the central office 6. The battery 11 is joined by leads 12 and 13 having connectors 14 and 16 to the central office switch 7 in the customary way.

A number of voice message connections are made, perhaps as many as ten thousand, from the central office switch 7. These numerous connections are represented herein by a couple of tokens. For example, connectors 18 and 19 form an individual pair that extends through line equipment 21 and is extended through talking and ringing conductors 22 and 23. These in turn extend between the central office 6 over a substantial distance to continuing conductors 24 and 25. The latter are joined in the standard way to an ultimate subscriber's telephone 26 at a remote location; for example, at his dwelling.

Similarly, and as another example, there extend from the central office switch mechanism 7 a similar pair of conductors 27 and 28 going to and through line equipment 29. From there a tip connector 30 and a ring connector 31 travel through a substantial distance to similar conductors 32 and 33. These are joined to another, typical subscriber's telephone 34 at a point remote from the central office 6.

Pursuant to ordinary practice, the lead 13 or battery conductor has a branch 36 extending through the line equipment 21 and so is effective upon the telephone 26. There also is a branch 37 or extension. This is effective through the line equipment 29 upon the telephone 34. A particular change from ordinary practice is made pursuant to this invention. That is, the other lead 12 from the battery 11, instead of going directly to the line equipment 21 and the line equipment 29, extends particularly to a special voltage modulator 38. This element 38 is in series with the lead 12 or conductor and also with a conductor 39 having one branch 41 to the line equipment 21 and another branch 42 to the line equipment 29.

The modulator 38 is effective, preferably through a control 40, to vary the voltage in the connected lines between values slightly above and slightly below the normal voltage (usually 48 volts) across the battery 11. Particularly, the modulator is able to vary such voltage at a frequency or at frequencies distinct from the normally occurring audible frequency or frequency range. Stated differently, the voltage variation due to operation of the modulator 38 is at a frequency within an inaudible range. This small, inaudible voltage variation is imposed, in one instance, through the mentioned circuitry, particularly upon the line equipment 21 and upon the conductors 22 and 23 as well as 24 and 25. This voltage, varied at an extra-audible frequency, is effective upon special end equipment 43 at or near the location of the subscriber's telephone 26. The equipment 43 is joined by a conductor 44 to the conductor 24 and by a conductor 45 to the conductor 25, and so is in shunt with the telephone 26.

Similarly, and simultaneously, any voltage variation due to the modulator 38 is also effective upon the line equipment 29 and upon the connectors 30 and 31 and the conductors 32 and 33. It is thus also effective upon a subscriber's end equipment 46 or set located close to the subscriber's telephone 34, the equipment 46 being joined by a conductor 47 to the conductor 33 and by a conductor 48 to the conductor 32.

Thus, when the modulator 38 is activated through the control 40, it varies the voltage across the lead 13 and the conductor 39, as well as across the extension 37 and the branch 42. That voltage variation is thus ultimately and simultaneously effective upon the special equipment 43 and special equipment 46. The voltage variation is too small or too distinct to make any consequential or disruptive voltage variation at audible frequency on the telephones 26 and 34.

With this arrangement, and without interfering with the usual or customary operation of the central office 6 and the telephones 26 and 34, a variation in the voltage due to the modulator 38 is simultaneously effective upon all of the individual responsive devices 43 and 46 at the various subscriber's premises. This unique signal is distributed without substantially interfering audibly with the operation of the telephones 26 and 34 or without substantially interfering with their operation at all.

With this arrangement, the end equipment 43 and 46 can be utilized to control devices located adjacent the individual phones 26 and 34 or elsewhere, usually on the subscriber's premises. Such devices can be, for example, temperature controls or various start-and-stop mechanisms. Furthermore, the control from the modulator 38 at the central office 6 over the various telephone lines connected to instruments, such as 26 and 34, remote from such office is accomplished with only a little extra equipment at the control office and at the remote premises and without in any wise directly using or adversely affecting or being detected in the normal voice communicating frequencies and without in any way adversely affecting the central office switching mechanism 7, which operates in an entirely normal way.

While all of the telephone subscribers may be simultaneously signalled by operation of the modulator 38 within one non-acoustic and non-audible voltage range, it is also possible to utilize closely related but differing frequencies of voltage range variation across the modulator. Each such range can afford a response in one or related ones of the subscriber's end equipments 43 responsive solely to that range without affecting the other subscriber's end equipment 46 which is responsive only in a slightly different range.

It is also quite feasible to employ more than one modulator, the individual modulators being connected to different blocks of end equipments or different natures of end equipments, but all using the normal telephone equipment for transmission of signals other than voice signals and perhaps of various different coded characters. This may include time division multiplexing and coded patterns of tones outside the voice frequency range.

In general, in addition to the installation of various special devices, such as 43 and 46, at the subscribers' premises, the only substantial change required for the above and other related new effects is the installation in the central office of a modulator or modulators and attendant controls in connection with the central battery 11.

I claim:

1. A signalling arrangement for use with a telephone system having a plurality of subscriber telephones individually connected by voice frequency lines to a central office exchange and connected by battery lines at the central office exchange to a common electrical battery, comprising:
   a plurality of individual response devices each located adjacent a related one of said subscriber telephones, means for connecting each of said responsive devices in circuit with the respective one of said related subscriber telephones, means for amplitude modulating said battery lines at a non audible frequency recognizable by said responsive devices, and means for connecting said modulating device through said battery lines at the central office exchange to said voice frequency lines for recognition by said responsive devices.

2. a signalling arrangement as in claim 1 in which said modulating device is in series between said battery and said telephones.

3. A signalling arrangement as in claim 1 in which each of said responsive devices is in parallel with the related one of said subscriber telephones.

4. A signalling arrangement as in claim 1 in which said signal is substantially distinguished from the normal voltage of said battery and from battery voltage changes at said voice frequency.

5. A signalling arrangement as in claim 1 in which each subscriber telephone and the related one of said responsive devices is at the subscriber's premises and remote from said central office at which said modulator is located.

6. A signalling arrangement as in claim 1 in which said modulating device changes the voltage of said battery only in an amount permitting substantially normal operation of said subscriber telephones.

7. A signalling arrangement as in claim 1 in which said signal recognized by one of said responsive devices is at one chosen frequency other than voice frequency, said signal recognized by another of said responsive devices is at another chosen frequency other than said voice frequency, and said modulating device is effective to supply signals at said chosen frequencies.

8. A signalling arrangement as in claim 7 in which said modulating device is effective to supply signals at either of said chosen frequencies.

9. A signalling arrangement for use with a telephone system having a plurality of subscriber telephones individually connected by voice frequency lines to a central office exchange and connected by battery lines at the central office exchange to a common electrical battery, comprising:
   a plurality of individual responsive devices each located adjacent a related one of said subscriber telephones, means for connecting each of said responsive devices in circuit with the respective one of said related subscriber telephones, means for amplitude modulating said battery lines at a non audible frequency to provide different coded patterns to respective groups of correspondingly coded responsive devices associated with said telephones, and means for connecting said modulating device through said battery lines at the central office exchange to said voice frequency lines for recognition by said responsive devices.

10. A signalling arrangement as in claim 9 in which said modulating device is in series between said battery and said telephones.

11. A signalling arrangement as in claim 9 in which each of said responsive devices is in parallel with the related one of said subscriber telephones.

12. A signalling arrangement as in claim 9 in which said signal is substantially distinguished from the normal voltage of said battery and from battery voltage changes at said voice frequency.

13. A signalling arrangement as in claim 9 in which each subscriber telephone and the related one of said responsive devices is at the subscriber's premises and remote from said central office at which said modulator is located.

14. A signalling arrangement as in claim 9 in which said modulating device changes the voltage of said battery only in an amount permitting substantially normal operation of said subscriber telephones.

15. A signalling arrangement as in claim 9 in which said signal recognized by one of said responsive devices is at one chosen frequency other than voice frequency, said signal recognized by another of said responsive devices is at another chosen frequency other than said voice frequency, and said modulating device is effective to supply signals at said chosen frequencies.

16. A signalling arrangement as in claim 15 in which said modulating device is effective to supply signals at either of said chosen frequencies.

* * * * *